(12) United States Patent
Jeong (10) Patent No.: US 11,515,754 B2
(45) Date of Patent: Nov. 29, 2022

(54) MOTOR

(71) Applicant: LG INNOTEK CO., LTD., Seoul (KR)

(72) Inventor: Won Seo Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/271,754

(22) PCT Filed: Sep. 9, 2019

(86) PCT No.: PCT/KR2019/011650
§ 371 (c)(1),
(2) Date: Feb. 26, 2021

(87) PCT Pub. No.: WO2020/055068
PCT Pub. Date: Mar. 19, 2020

(65) Prior Publication Data
US 2021/0320562 A1 Oct. 14, 2021

(30) Foreign Application Priority Data
Sep. 12, 2018 (KR) .................... 10-2018-0108997

(51) Int. Cl.
*F16H 45/02* (2006.01)
*H02K 7/116* (2006.01)
(Continued)

(52) U.S. Cl.
CPC ............ *H02K 7/116* (2013.01); *F16H 1/46* (2013.01); *H02K 7/083* (2013.01); *B62D 5/0403* (2013.01)

(58) Field of Classification Search
CPC ...... H02K 7/116; H02K 7/083; H02K 5/1737; H02K 7/003; F16H 1/46; F16H 1/28; B62D 5/0403; B62D 5/0415
See application file for complete search history.

(56) References Cited

U.S. PATENT DOCUMENTS 4,014,224 A * 3/1977 Pitts ...................... F16H 1/32
475/180
9,302,580 B2 * 4/2016 Smetana ............. B60L 15/2054
(Continued)

FOREIGN PATENT DOCUMENTS

JP 2008-024059 2/2008
JP 2008-120291 5/2008
(Continued)

OTHER PUBLICATIONS

International Search Report dated Dec. 18, 2019 issued in Application No. PCT/KR2019/011650.

*Primary Examiner* — Stacey A Fluhart
*Assistant Examiner* — Farhana Pervin
(74) *Attorney, Agent, or Firm* — KED & Associates LLP (57) ABSTRACT

One embodiment relates to a motor comprising: a hollow first shaft; a rotor coupled to the first shaft; a stator arranged outside the rotor; a hollow second shaft arranged inside the first shaft; a first planetary gear part which comes in contact with the inner circumferential surface of the first shaft; a second planetary gear part which comes in contact with the inner circumferential surface of the second shaft; and a third shaft for connecting the first planetary gear part and the second planetary gear part, wherein the rotation of the first shaft is decelerated by the first planetary gear part and the second planetary gear part and then delivered to the second shaft. Accordingly, an RPM that is lower than the RPM generated by the output of the motor can be applied to an output shaft of a steering shaft.

12 Claims, 5 Drawing Sheets

(51) Int. Cl.
 *F16H 1/46* (2006.01)
 *H02K 7/08* (2006.01)
 *B62D 5/04* (2006.01)

(56) References Cited

U.S. PATENT DOCUMENTS

2006/0264290 A1* 11/2006 Arbanas .............. B62D 5/008
 475/18
2012/0190491 A1* 7/2012 Gunji ................... H02K 16/00
 475/5
2015/0354672 A1* 12/2015 Bouwer ................ B64C 27/12
 475/248
2016/0319909 A1* 11/2016 Lu ........................ F03D 15/10

FOREIGN PATENT DOCUMENTS

KR 10-2017-0082925 7/2017
WO WO 2011/116780 9/2011

* cited by examiner

MOTOR

CROSS-REFERENCE TO RELATED PATENT APPLICATIONS

This application is a U.S. National Stage Application under 35 U.S.C. § 371 of PCT Application No. PCT/KR2019/011650, filed Sep. 9, 2019, which claims priority to Korean Patent Application No. 10-2018-0108997, filed Sep. 12, 2018, whose entire disclosures are hereby incorporated by reference.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

Particularly, as more electric devices are used in a vehicle, demands for a motor applied to a steering system, a braking system, a machinery system, and the like are significantly increasing. For example, an electronic power steering (EPS) system, in which the motor is used, secures turning stability and provides a rapid restoring force using an electronic control unit (ECU) configured to control driving of the motor according to operating conditions. Accordingly, a driver of the vehicle can travel safely.

The EPS uses a signal of a sensor assembly which measures a torque and a steering angle of a steering shaft to provide a proper torque to the steering shaft. In this case, the steering shaft of a vehicle may include an input shaft connected to a handle, an output shaft connected to a power transmission system of a wheel side, and a torsion bar connecting the input shaft and the output shaft.

In the vehicle in which the EPS is installed, a steering gear ratio control unit may be provided between a steering wheel and a steering actuator, and the steering gear ratio control unit may operate to change an output angle corresponding to a steering input of the steering wheel, thereby further stabilizing movement of the vehicle.

However, in a case in which a separate speed reducer (steering gear ratio control unit) is used, since the speed reducer should be installed in addition to the motor, there is a problem in that utilization of a space of the vehicle is reduced.

Accordingly, there is a need for a motor provided with a speed reducing function and a compact structure.

Technical Problem

The present invention is directed to providing a motor which is compact and uses two planetary gears and a hollow shaft to apply reduced revolutions per minute (RPM) to an output shaft of a steering shaft. Alternatively, the present invention is directed to providing a motor configured to assist steering of a steering wheel.

The present invention is directed to providing a motor in which two hollow shafts are connected using planetary gears having different gear ratios to apply reduced RPM to an output shaft of a steering shaft.

Objectives to be solved by the present invention are not limited to the above-described objectives, and other objectives which are not described above will be clearly understood by those skilled in the art from the following specification.

Technical Solution

One aspect of the present invention provides a motor including a first shaft having a hollow shape, a rotor coupled to the first shaft, a stator disposed outside the rotor, a second shaft having a hollow shape and disposed in the first shaft, a first planetary gear part in contact with an inner circumferential surface of the first shaft, a second planetary gear part in contact with an inner circumferential surface of the second shaft, and a third shaft connecting the first planetary gear part and the second planetary gear part, wherein a rotation speed of the first shaft is reduced by the first planetary gear part and the second planetary gear part, and the reduced rotation speed is transmitted to the second shaft.

The first shaft may include a first region formed to have a first inner diameter, a second region formed to have a second inner diameter, and a first connecting part connecting the first region and the second region, wherein the rotor may be disposed on an outer circumferential surface of the first region, the first planetary gear part may be disposed on an inner circumferential surface of the second region, and the first inner diameter may be smaller than the second inner diameter.

The second shaft rotatably disposed inside the first shaft may include a third region formed to have a third inner diameter, a fourth region formed to have a fourth inner diameter, and a second connecting part connecting the third region and the fourth region, wherein the second planetary gear part may be disposed on an inner circumferential surface of the fourth region, and the third inner diameter may be smaller than the fourth inner diameter.

The rotor disposed above the first connecting part may overlap the first connecting part in a shaft direction.

The fourth region disposed inside the second region may be disposed under the first connecting part.

The first planetary gear part may include a first sun gear, and a plurality of first planetary gears configured to rotate along an outer circumferential surface of the first sun gear, wherein the first planetary gears may be in contact with the inner circumferential surface of the second region.

An outer diameter of the first sun gear may be greater than an outer diameter of the first planetary gear.

The second planetary gear part may include a second sun gear, and a plurality of second planetary gears configured to rotate along an outer circumferential surface of the second sun gear, wherein the second planetary gears may be in contact with the inner circumferential surface of the fourth region.

An outer diameter of the second sun gear may be greater than an outer diameter of the second planetary gear.

The third shaft may connect a center of the first sun gear and a center of the second sun gear.

The motor may further include a housing disposed outside the stator, wherein a first bearing may be disposed between an inner circumferential surface of the housing and an outer circumferential surface of the second region in a radial direction.

An outer diameter of the first planetary gear part may be greater than an outer diameter of the second planetary gear part.

An end portion of the third shaft disposed between the first planetary gear part and the second planetary gear part may be rotatably disposed in a second bearing disposed on a lower surface of the housing.

An end portion of the second shaft may be connected to an output shaft of a steering apparatus.

Advantageous Effects

In a motor according to embodiments, two hollow shafts are connected using planetary gears having different gear ratios so that revolutions per minute (RPM) which are reduced from RPM generated by an output of the motor can be applied to an output shaft of a steering shaft. Alternatively, in the motor, two hollow shafts are connected using the planetary gears having the different gear ratios so that steering of a steering wheel can be assisted.

In addition, since the planetary gears are disposed in the hollow shafts, the motor can be formed compactly. In this case, since the planetary gears are disposed in a housing of the motor, the planetary gears can be protected from physical and chemical stimuli.

Various and useful advantages and effects are not limited to the above-described contents and will be more easily understood when specific embodiments are described.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

Figure 1:
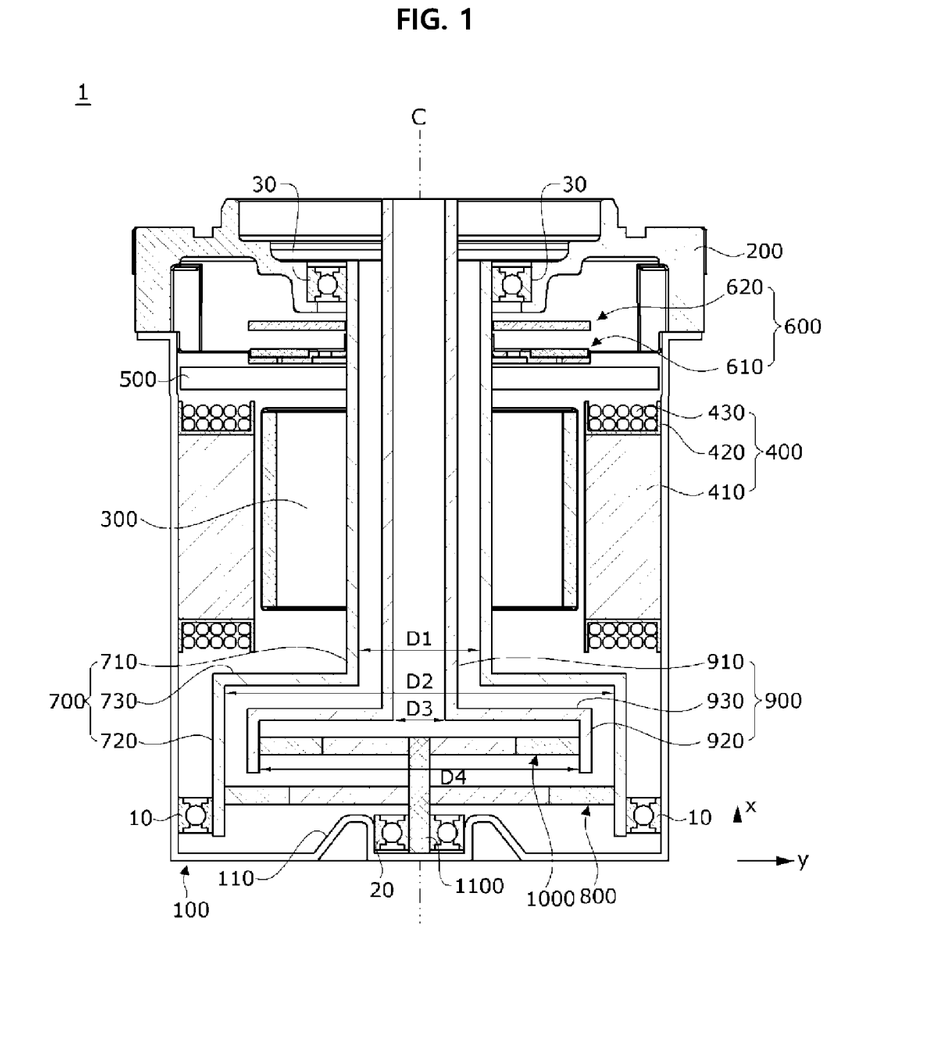
FIG. 1 is a view illustrating a motor according to an embodiment.
Figure 2:
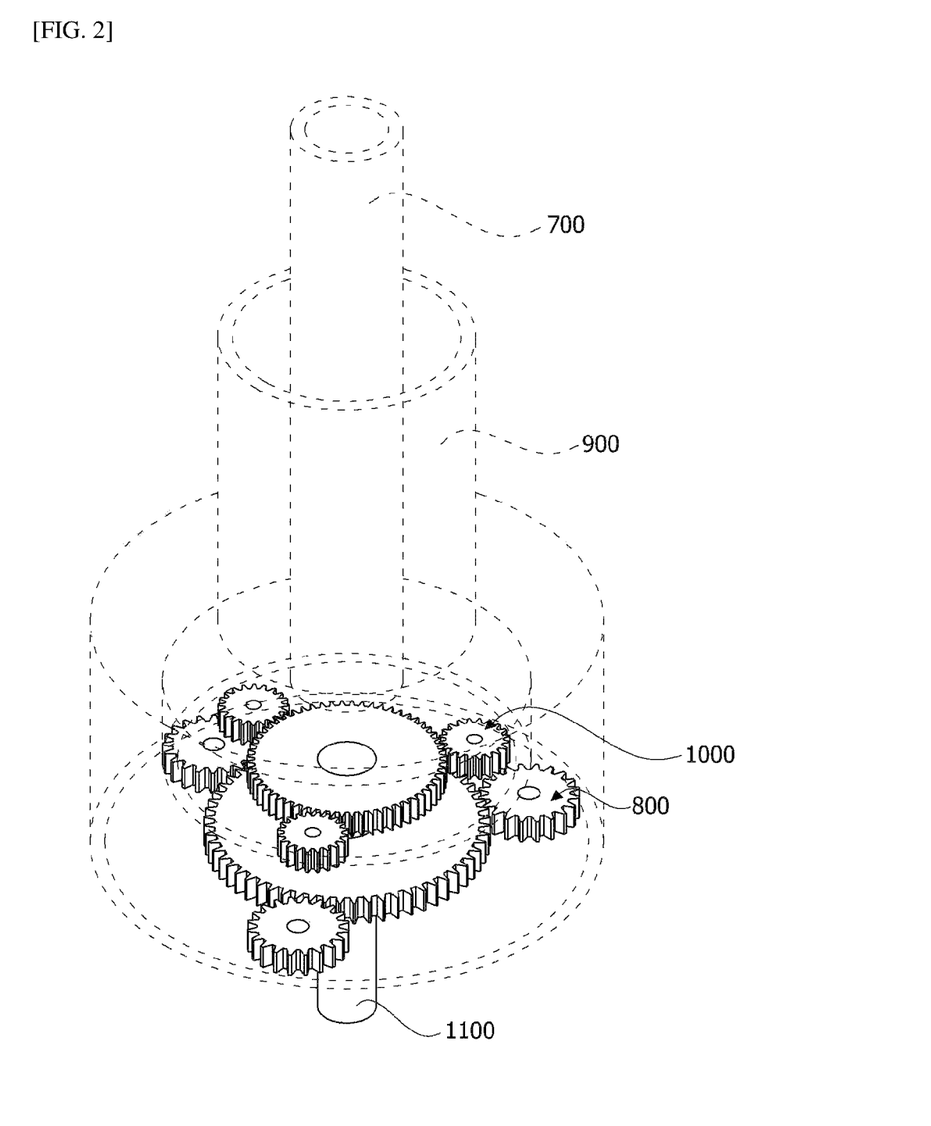
FIG. 2 is a perspective view illustrating coupling relationships of a first shaft, a second shaft, a first planetary gear part, and a second planetary gear part of the motor according to the embodiment.
Figure 3:
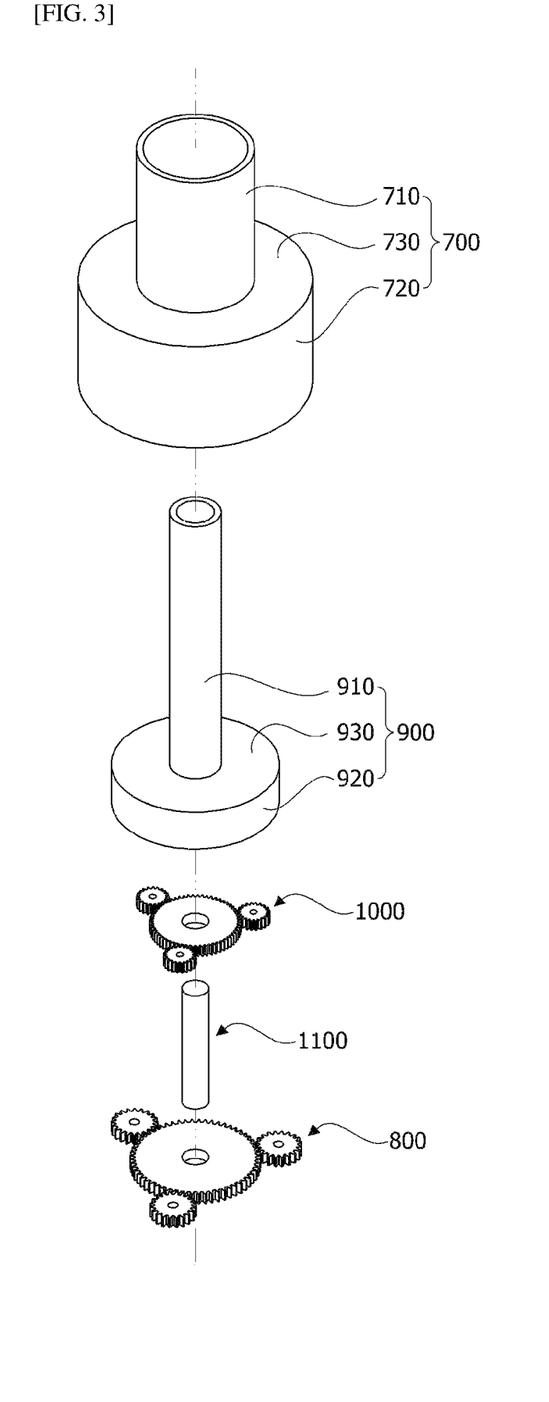
FIG. 3 is a perspective view illustrating the coupling relationships of the first shaft, the second shaft, the first planetary gear part, and the second planetary gear part of the motor according to the embodiment.
Figure 4:
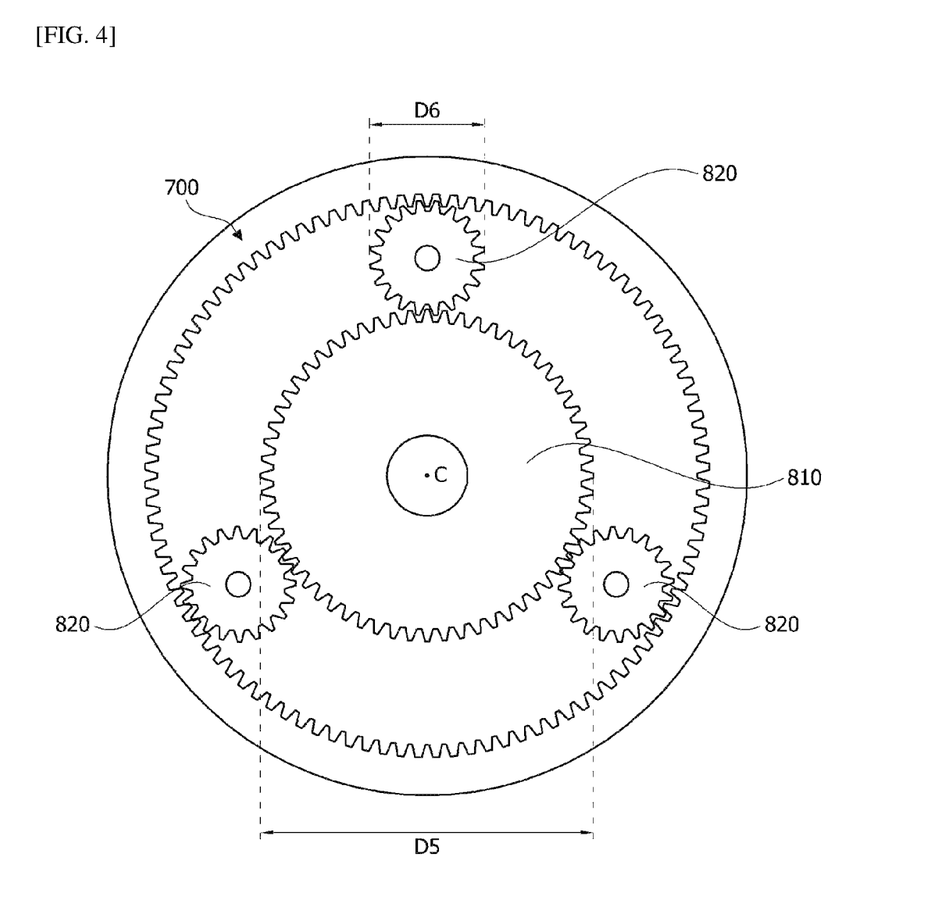
FIG. 4 is a bottom view illustrating a coupling relationship between the first shaft and the first planetary gear part of the motor according to the embodiment.
Figure 5:
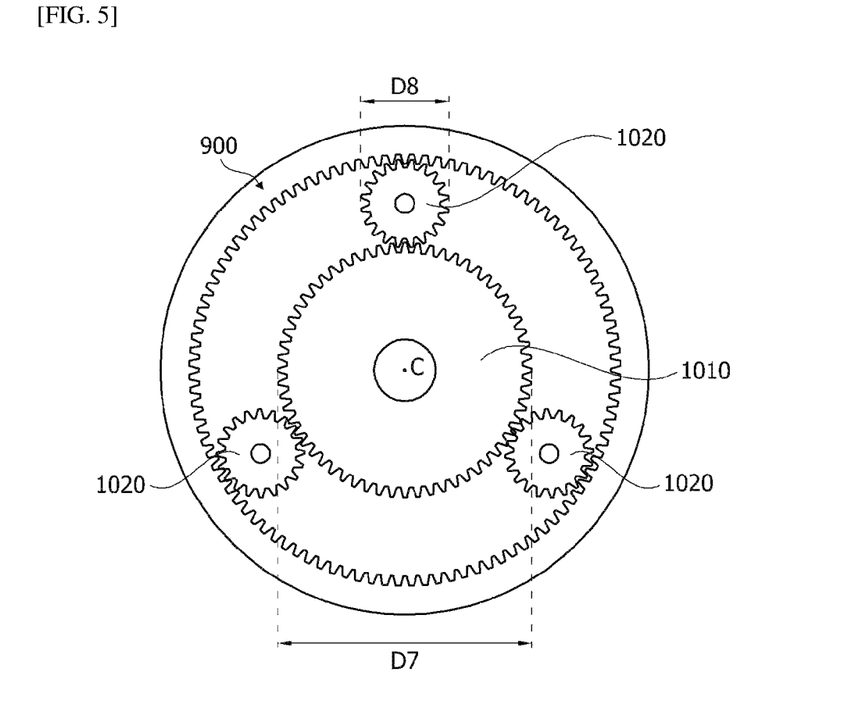
FIG. 5 is a bottom view illustrating a coupling relationship between the second shaft and the second planetary gear part of the motor according to the embodiment.

FIG. 1 is a view illustrating a motor according to an embodiment, FIG. 2 is a perspective view illustrating coupling relationships of a first shaft, a second shaft, a first planetary gear part, and a second planetary gear part of the motor according to the embodiment, FIG. 3 is a perspective view illustrating the coupling relationships of the first shaft, the second shaft, the first planetary gear part, and the second planetary gear part of the motor according to the embodiment, FIG. 4 is a bottom view illustrating a coupling relationship between the first shaft and the first planetary gear part of the motor according to the embodiment, and FIG. 5 is a bottom view illustrating a coupling relationship between the second shaft and the second planetary gear part of the motor according to the embodiment. In FIG. 1, an x direction may be referred to as a shaft direction, and a y direction may be referred to as a radial direction. In addition, the shaft direction may be perpendicular to the radial direction.

Referring to FIGS. 1 and 2, a motor 1 according to the embodiment may include a housing 100 in which an opening is formed at one side thereof, a cover 200 disposed on the housing 100, a rotor 300 coupled to a first shaft 700, a stator 400 disposed in the housing 100, a busbar 500 disposed above the stator 400, a sensor part 600 configured to detect rotation of the rotor 300, a first shaft 700 configured to rotate with the rotor 300, a first planetary gear part 800 in contact with an inner circumferential surface of the first shaft 700, a hollow second shaft 900 of which one portion is disposed in the first shaft 700, a second planetary gear part 1000 in contact with an inner circumferential surface of the second shaft 900, and a third shaft 1100 connecting the first planetary gear part 800 and the second planetary gear part 1000.

In this case, due to an electrical interaction between the rotor 300 and the stator 400, the first shaft 700 is rotated. In addition, a rotation speed of the first shaft 700 is reduced by the first planetary gear part 800 and the second planetary gear part 1000, and the reduced rotation speed is transmitted to the second shaft 900. In this case, the second shaft 900 may be connected to an output shaft of a steering shaft (not shown) of a steering apparatus. Accordingly, the motor 1 may apply reduced revolutions per minute (RPM) to the output shaft.

That is, in the motor 1, the first planetary gear part 800 and the second planetary gear part 1000 are used to reduce RPM of the first shaft 700 and transmit the reduced RPM to the second shaft 900. Accordingly, the motor 1 may apply the reduced RPM to the output shaft.

In addition, in the motor, the first planetary gear part 800 and the second planetary gear part 1000 are respectively disposed in the hollow first shaft 700 and the hollow second shaft 900 so that a size of the motor can be compact. In this case, since the first planetary gear part 800 and the second planetary gear part 1000 are disposed in the housing 100, the first planetary gear part 800 and the second planetary gear part 1000 may be protected from physical and chemical stimuli.

The motor 1 may be a motor used in an electronic power steering (EPS) system. The EPS System may use a driving force of the motor to assist a steering force so that turning stability is secured and a rapid restoring force is provided. Accordingly, a driver may travel safely.

For example, the motor 1 may also be used in a rack type EPS or a column type EPS.

In addition, the motor 1 may be used in an X-by-Wire system. In this case, the X-by-Wire system is a steering system in which a steering wheel is mechanically separated from a driving wheel of a vehicle and which receives a rotation signal of the steering wheel through an electronic control unit (ECU) and operates a steering motor connected to the driving wheel on the basis of the received rotation signal to steer the vehicle. In this case, the X-by-Wire system may be referred to as a Steer-by-Wire system.

In the X-by-Wire system, since a mechanical connection structure included in the conventional steering system is removed, and the motor 1 is controlled through an electric connection such as an electric wire, there are advantages in that a degree of layout freedom can be improved when the steering system is formed, fuel economy may be improved, and a disturbance reversely input from a vehicle wheel may be removed.

For example, in the case of the conventional steering system, a steering reaction force does not need to be additionally generated due to a mechanical connection structure using an universal joint and the like, but in the case of the X-by-Wire system, since a mechanical connection structure is not present, a steering reaction force or restoring reaction force may be generated using the motor and the like.

In addition, the motor 1 may apply RPM to the output shaft of the steering shaft, wherein the RPM is reduced from RPM generated by an output of the motor.

The housing 100 and the cover 200 may form an exterior of the motor 1. In addition, an accommodation space may be formed by coupling the housing 100 and the cover 200. Accordingly, as illustrated in FIG. 1, the rotor 300, the stator 400, the busbar 500, the sensor part 600, the first shaft 700, the first planetary gear part 800, the second shaft 900, the second planetary gear part 1000, and the like may be disposed in the accommodation space. In this case, the first shaft 700 is rotatably disposed in the accommodation space. In addition, the motor 1 may further include bearings disposed on upper and lower portions of the first shaft 700.

The housing 100 may be formed in a cylindrical shape. In addition, the rotor 300, the stator 400, and the like may be accommodated in the housing 100. In this case, the shape or a material of the housing 100 may be variously changed. For example, the housing 100 may be formed of a metal material which firmly withstands even at high temperature.

Referring to FIG. 1, an inner circumferential surface of the housing 100 may support one side of a first bearing 10 disposed on an outer circumferential surface of the first shaft 700. Accordingly, the first bearing 10 rotatably supports the first shaft 700 with respect to the housing 100.

In addition, a second bearing 20 may be disposed on a lower surface in the housing 100. In this case, a protruding portion 110 formed to protrude may be disposed on the lower surface of the housing 100 to support the second bearing 20. Accordingly, the second bearing 20 may be accommodated in the protruding portion 110.

The cover 200 may be disposed on an open surface of the housing 100, that is, an upper portion of the housing 100, to cover an opening of the housing 100.

As illustrated in FIG. 1, a third bearing 30 is disposed on the cover 200 to rotatably support the upper portion of the first shaft 700.

Referring to FIG. 1, the rotor 300 may be disposed inside the stator 400, and the first shaft 700 may be coupled to a central portion through a press-fitting method. In this case, the term "inside" may be referred to as a direction toward a center C, and the term "outside" may be referred to as a direction opposite to the term "inside."

In addition, the rotor 300 may be rotatably disposed inside the stator 400.

The rotor 300 may include a rotor core (not shown) and a plurality of magnets (not shown) disposed on outer circumferential surface of the rotor core in a circumferential direction. In this case, the magnets may be referred to as rotor magnets or drive magnets.

In this case, an example in which the plurality of magnets are disposed on the outer circumferential surface of the rotor core in the rotor 300 is described, but the present invention is not necessarily limited thereto. For example, the rotor 300 may also be formed as an interior permanent magnet (IPM) type rotor in which magnets are disposed in a rotor core.

The rotor core may be formed in a form, in which a plurality of circular thin steel plates are stacked, or a single cylindrical form. In addition, a hole coupled to the first shaft 700 may be formed at the center C of the rotor core.

The magnets generate a rotating magnetic field with coils 430 wound around the stator core 410 of the stator 400. The magnets may be disposed so that an N-pole and an S-pole are alternately disposed around the first shaft 700 in the circumferential direction.

Accordingly, due to an electrical interaction between the coils 430 and the magnets, the rotor 300 is rotated, and the first shaft 700 is rotated in conjunction with the rotation of the rotor 300 so that a driving force of the motor 1 is generated.

Meanwhile, the rotor 300 may further include a can (not shown) disposed to cover the rotor core to which the magnets are attached.

The can may protect the rotor core and the magnets from external shocks and physical and chemical stimuli while preventing foreign materials from being introduced to the rotor core and the magnets.

In addition, the can prevents the magnets from being separated from the rotor core.

The stator 400 may be disposed inside the housing 100. In this case, the stator 400 may be coupled to the housing 100 through a hot press-fitting method. Accordingly, the stator 400 may be supported by the inner circumferential surface of the housing 100. In addition, the stator 400 is disposed outside the rotor 300. That is, the rotor 300 may be rotatably disposed inside the stator 400.

Referring to FIG. 1, the stator 400 may include the stator core 410, insulators 420 disposed on the stator core 410, and the coils 430 wound around the insulators 420. In this case, the insulators 420 may be disposed between the stator core 410 and the coils 430 to insulate the coils 430 from the stator core 410.

The coils 430 configured to generate a rotating magnetic field may be wound around the stator core 410. In this case, the stator core 410 may be formed as one single product or a plurality of divided cores that are coupled.

The stator core 410 may be formed in a form in which a plurality of thin steel plates are stacked, but the present invention is not necessarily limited thereto. For example, the stator core 410 may also be formed as one single product.

The stator core 410 may include a yoke (not shown) and a plurality of teeth (not shown) protruding from the yoke in the radial direction. In addition, the coil 430 may be wound around the tooth.

The insulators 420 insulate the stator core 410 from the coils 430. Accordingly, the insulators 420 may be disposed between the stator core 410 and the coils 430.

Accordingly, the coils 430 may be wound around the stator core 410 on which the insulators 420 are disposed.

The busbar 500 may be disposed above the stator 400.

In addition, the busbar 500 may be electrically connected to the coils 430 of the stator 400.

The busbar 500 may include a busbar body and a plurality of terminals disposed in the busbar body. In this case, the busbar body may be a mold product formed through an injection molding process. In addition, the terminals may be electrically connected to the coils 430 of the stator 400.

The sensor part 600 may detect a magnetic force of a sensing magnet installed to rotate in conjunction with the rotor 300 to check a present position of the rotor 300 so as to detect rotation of the first shaft 700.

The sensor part 600 may include the sensing magnet assembly 610 and a printed circuit board (PCB) 620.

The sensing magnet assembly 610 is coupled to the first shaft 700 to operate in conjunction with the rotor 300 to detect the position of the rotor 300. In this case, the sensing magnet assembly 610 may include sensing magnets and a sensing plate. In this case, the sensing magnets and the sensing plate may be coaxially coupled.

The sensing magnets may include main magnets disposed close to a hole of the sensing plate forming an inner circumferential surface thereof in the circumferential direction and sub-magnets formed on an edge thereof.

The main magnets may be arranged like the drive magnets inserted into the rotor 300 of the motor.

The sub-magnets may be divided further than the main magnets so that the sub-magnets may be formed to have poles of which the number is greater than the number of poles of the main magnets. Accordingly, a rotation angle may be divided and measured more precisely, and thus the motor may be driven more smoothly.

The sensing plate may be formed of a metal material having a disc shape. The sensing magnet may be coupled to an upper surface of the sensing plate. In addition, the sensing plate may be coupled to the first shaft 700. In this case, the hole through which the first shaft 700 passes may be formed in the sensing plate.

A sensor configured to detect a magnetic force of the sensing magnet may be disposed on the PCB 620. In this case, the sensor may be provided as a Hall integrated circuit (IC). In addition, the sensor may detect a change in an N-pole and a S-pole of the sensing magnet to generate a sensing signal.

The first shaft 700 may be formed as a hollow shaft in which a space is formed.

As illustrated in FIG. 1, the first shaft 700 may be rotatably supported by the bearing in the housing 100. In addition, the first shaft 700 may be rotated in conjunction with rotation of the rotor 300.

Referring to FIG. 1, the first shaft 700 may include a first region 710 formed to have a first inner diameter D1, a second region 720 formed to have a second inner diameter D2, and a first connecting part 730 connecting the first region 710 and the second region 720. In this case, the first region 710, the second region 720, and the first connecting part 730 may be integrally formed.

The first region 710 of the first shaft 700 may be formed in a cylindrical shape having an outer diameter and the inner diameter D1. Accordingly, as illustrated in FIG. 1, the rotor 300 may be disposed on an outer circumferential surface of the first region 710.

In addition, the inner diameter D1 of the first region 710 is smaller than the inner diameter D2 of the second region 720. In this case, the outer diameter of the first region 710 is smaller than the inner diameter D2 of the second region 720.

The second region 720 of the first shaft 700 may be formed in a cylindrical shape having an outer diameter and the inner diameter D2.

In addition, the first planetary gear part 800 may be gear-coupled to an inner circumferential surface of the second region 720. Accordingly, gear teeth gear-coupled to gear teeth of the first planetary gear part 800 may be formed on the inner circumferential surface of the second region 720. In this case, the gear teeth formed on the inner circumferential surface of the second region 720 may be referred to as first gear teeth.

In this case, the inner diameter D2 of the second region 720 may be the same as an outer diameter of the first planetary gear part 800. In addition, the outer diameter of the second region 720 may be greater than an outer diameter of the rotor 300.

The first connecting part 730 of the first shaft 700 may be formed in a ring shape having a predetermined width in the radial direction. Accordingly, an end portion of the first region 710 may be connected to an inner side of the connecting part 730, and an end portion of the second region 720 may be connected to an outer side of the first connecting part 730.

In addition, the rotor 300 may be disposed above the first connecting part 730. Accordingly, the rotor 300 may overlap the first connecting part 730 in the shaft direction.

The first planetary gear part 800 rotates in conjunction with rotation of the first shaft 700.

The first planetary gear part 800 may be gear-coupled to the inner circumferential surface of the first shaft 700. As illustrated in FIG. 1, the first planetary gear part 800 may be gear-coupled to the inner circumferential surface of the second region 720. Accordingly, a rotation speed of the first shaft 700 may be reduced by the first planetary gear part 800.

Referring to FIGS. 2 and 3, the first planetary gear part 800 may include a first sun gear 810 and a plurality of first planetary gears 820 configured to rotate along an outer circumferential surface of the first sun gear 810. In this case, the first planetary gears 820 may be in contact with and be gear-coupled to the inner circumferential surface of the second region 720. That is, when viewed from above, the first planetary gears 820 may be disposed between the inner circumferential surface of the second region 720 and the first sun gear 810.

As illustrated in FIG. 4, an outer diameter D5 of the first sun gear 810 may be greater than an outer diameter D6 of the first planetary gear 820.

The second shaft 900 may be formed as a hollow shaft in which a space is formed.

The second shaft 900 may be rotatably disposed in the first shaft 700. As illustrated in FIG. 1, the second shaft 900 may be disposed in the first shaft 700 to be rotatable by the first planetary gear part 800, the second planetary gear part 1000, and the third shaft 1100. Accordingly, the second shaft 900 may rotate in conjunction with rotation of the first shaft 700. However, a rotation speed of the second shaft 900 may be reduced by the first planetary gear part 800 and the second planetary gear part 1000 disposed between the first shaft 700 and the second shaft 900, respectively.

Referring to FIG. 1, the second shaft 900 may include a third region 910 formed to have a third inner diameter D3, a fourth region 920 formed to have a fourth inner diameter D4, and a second connecting part 930 connecting the third region 910 and the fourth region 920. In this case, the third region 910, the fourth region 920, and the second connecting part 930 may be integrally formed.

The third region 910 of the second shaft 900 may be formed in a cylindrical shape having an outer diameter and the inner diameter D3. In this case, the third region 910 of the second shaft 900 may be disposed inside the first region 710. In addition, one lower portion of the third region 910 may be disposed inside the second region 720 so that the fourth region 920 and the second connecting part 930 are disposed in the second region 720.

In addition, the inner diameter D3 of the third region 910 may be smaller than the inner diameter D4 of the fourth region 920. In this case, the outer diameter of the third region 910 is smaller than the inner diameter D4 of the fourth region 920.

The fourth region 920 of the second shaft 900 may be formed in a cylindrical shape having an outer diameter and the inner diameter D4.

In addition, the second planetary gear part 1000 may be gear-coupled to an inner circumferential surface of the fourth region 920. Accordingly, gear teeth gear-coupled to gear teeth of the second planetary gear part 1000 may be formed on the inner circumferential surface of the fourth region 920. In this case, the gear teeth formed on the inner circumferential surface of the fourth region 920 may be referred to as a second gear teeth.

In this case, the inner diameter D4 of the fourth region 920 may be the same as an outer diameter of the second planetary gear part 1000. In addition, the outer diameter of the fourth region 920 may be greater than the outer diameter of the rotor 300. In addition, since the fourth region 920 is rotatably disposed inside the second region 720, the outer diameter of the fourth region 920 is smaller than the inner diameter D2 of the second region 720.

In addition, the fourth region 920 may be disposed under the first connecting part 730 of the first shaft 700.

Meanwhile, a bearing (not shown) may be further disposed between the inner circumferential surface of the second region 720 and an outer circumferential surface of the fourth region 920 in consideration of supporting the second shaft 900 in the radial direction. In this case, the bearing between the inner circumferential surface of the second region 720 and the outer circumferential surface of the fourth region 920 may be referred to as a fourth bearing.

The second connecting part 930 of the second shaft 900 may be formed in a ring shape having a predetermined width in the radial direction. Accordingly, an end portion of the third region 910 is connected to an inner side of the second connecting part 930, and an end portion of the fourth region 920 may be connected to an outer side of the second connecting part 930.

In addition, the first connecting part 730 may be disposed above the second connecting part 930. Accordingly, the first connecting part 730 may overlap the second connecting part 930 in the shaft direction.

The second planetary gear part 1000 rotates in conjunction with rotation of the first planetary gear part 800. In this case, the first planetary gear part 800 and the second planetary gear part 1000 may be connected by the third shaft 1100.

The second planetary gear part 1000 may be gear-coupled to the inner circumferential surface of the second shaft 900. As illustrated in FIG. 1, the second planetary gear part 1000 may be gear-coupled to the inner circumferential surface of the fourth region 920. Accordingly, a rotation speed of the second shaft 900 may be reduced by the second planetary gear part 1000.

Referring to FIGS. 2 and 3, the second planetary gear part 1000 may include a second sun gear 1010 and a plurality of second planetary gears 1020 configured to rotate along an outer circumferential surface of the second sun gear 1010. In this case, the second planetary gear 1020 may be in contact with and be gear-coupled to the inner circumferential surface of the fourth region 920. That is, when viewed from above, the second planetary gears 1020 may be disposed between the inner circumferential surface of the fourth region 920 and the second sun gear 1010.

As illustrated in FIG. 5, an outer diameter D7 of the second sun gear 1010 may be greater than an outer diameter D8 of the second planetary gear 1020. In this case, the outer diameter D7 of the second sun gear 1010 may be smaller than the outer diameter D5 of the first sun gear 810. That is, the outer diameter D5 of the first sun gear 810 may be greater than the outer diameter D7 of the second sun gear 1010.

The third shaft 1100 transmits rotation of the first planetary gear part 800 to the second planetary gear part 1000. In this case, the third shaft 1100 may connect a center of the first sun gear 810 and a center of the second sun gear 1010.

In this case, a lower end portion of the third shaft 1100 may be rotatably supported by the second bearing 20.

In the motor 1, since the first planetary gear part 800 and the second planetary gear part 1000 having different gear ratios are respectively disposed in the second region 720 of the first shaft 700 and the fourth region 920 of the second shaft 900, RPM which is reduced from RPM generated by an output of the motor 1 may be applied to the output shaft of the steering shaft.

In addition, since the first planetary gear part 800 and the second planetary gear part 1000 having the different gear ratios may be respectively disposed in the second region 720 of the first shaft 700 and the fourth region 920 of the second shaft 900, a size of the motor 1 may be compact.

In addition, in the first shaft 700, since the inner diameter D2 of the second region 720 is greater than the inner diameter D1 of the first region 710, a diameter of the first planetary gear part 800 may be maximized. Accordingly, the gear ratio of the first sun gear 810 to the first planetary gear

820 disposed in the first planetary gear part 800 may be adjusted to improve a speed reduction ratio.

In addition, in the second shaft 900, since the inner diameter D4 of the fourth region 920 is greater than the inner diameter D3 of the third region 910, a diameter of the second planetary gear part 1000 may be maximized. Accordingly, the gear ratio of the second sun gear 1010 to the second planetary gear 1020 disposed in the second planetary gear part 1000 may be adjusted to improve a speed reduction ratio.

While the present invention has been described with reference to the exemplary embodiments thereof, it will be understood by those skilled in the art that various changes in form and details may be made therein without departing from the spirit and scope of the invention as defined by the appended claims.

REFERENCE NUMERALS

| | |
|---|---|
| 1: MOTOR | 100: HOUSING |
| 200: COVER | 300: ROTOR |
| 400: STATOR | 410: STATOR CORE |
| 420: INSULATOR | 430: COIL |
| 500: BUSBAR | 600: SENSOR PART |
| 700: FIRST SHAFT | 800: FIRST PLANETARY GEAR PART |
| 900: SECOND SHAFT | |
| 1000: SECOND PLANETARY GEAR PART | |
| 1100: THIRD SHAFT | |

The invention claimed is:

1. A motor comprising:
a first shaft having a hollow shape;
a rotor coupled to the first shaft;
a stator disposed outside the rotor;
a second shaft having a hollow shape and disposed in the first shaft;
a first planetary gear part in contact with an inner circumferential surface of the first shaft;
a second planetary gear part in contact with an inner circumferential surface of the second shaft;
a third shaft connecting the first planetary gear part and the second planetary gear part,
wherein a rotation speed of the first shaft is reduced by the first planetary gear part and the second planetary gear part, and
the reduced rotation speed is transmitted to the second shaft,
wherein the first shaft includes:
a first region formed to have a first inner diameter;
a second region formed to have a second inner diameter; and
a first connecting part connecting the first region and the second region,
wherein the rotor is disposed on an outer circumferential surface of the first region,
the first planetary gear part is disposed on an inner circumferential surface of the second region, and
the first inner diameter is smaller than the second inner diameter,
wherein the second shaft rotatably disposed inside the first shaft includes:
a third region formed to have a third inner diameter;
a fourth region formed to have a fourth inner diameter; and
a second connecting part connecting the third region and the fourth region,
wherein the second planetary gear part is disposed on an inner circumferential surface of the fourth region, and
the third inner diameter is smaller than the fourth inner diameter,
wherein the rotor is disposed on the first connecting part in a direction parallel to a shaft direction,
wherein the fourth region disposed inside the second region is disposed on the first connecting part.

2. The motor of claim 1, wherein the first planetary gear part includes:
a first sun gear; and
a plurality of first planetary gears configured to rotate along an outer circumferential surface of the first sun gear,
wherein the first planetary gears are in contact with the inner circumferential surface of the second region.

3. The motor of claim 2, wherein an outer diameter of the first sun gear is greater than an outer diameter of the first planetary gear.

4. The motor of claim 3, wherein the second planetary gear part includes:
a second sun gear; and
a plurality of second planetary gears configured to rotate along an outer circumferential surface of the second sun gear,
wherein the second planetary gears are in contact with the inner circumferential surface of the fourth region.

5. The motor of claim 4, wherein an outer diameter of the second sun gear is greater than an outer diameter of the second planetary gear.

6. The motor of claim 5, wherein the third shaft connects a center of the first sun gear and a center of the second sun gear.

7. The motor of claim 1, further comprising a housing, wherein a first bearing is disposed between an inner circumferential surface of the housing and an outer circumferential surface of the second region in a radial direction.

8. The motor of claim 1, wherein an outer diameter of the first planetary gear part is greater than an outer diameter of the second planetary gear part.

9. The motor of claim 7, wherein an end portion of the third shaft is coupled to a second bearing disposed on a lower surface of the housing.

10. A motor comprising:
a first shaft having a hollow shape;
a rotor coupled to the first shaft;
a stator disposed outside the rotor;
a second shaft having a hollow shape and disposed in the first shaft;
a first planetary gear part in contact with an inner circumferential surface of the first shaft;
a second planetary gear part in contact with an inner circumferential surface of the second shaft; and
a third shaft connecting the first planetary gear part and the second planetary gear part,
wherein a gear ratio of the first planetary gear part is different from a gear ratio of the second planetary gear part, wherein:
the first shaft includes a first region formed to have a first inner diameter, a second region formed to have a second inner diameter, and a first connecting part connecting the first region and the second region;

the second shaft includes a third region formed to have a third inner diameter, a fourth region formed to have a fourth inner diameter, and a second connecting part connecting the third region and the fourth region; and the second inner diameter is greater than the fourth inner diameter, the first planetary gear part is in contact with an inner circumferential surface of the second region; and the second planetary gear part is in contact with an inner circumferential surface of the fourth region, wherein an inner side of the stator overlaps an outer side the first connecting part in a shaft direction.

11. The motor of claim 3, wherein:

the first planetary gear part includes a first sun gear and a plurality of first planetary gears configured to rotate along an outer circumferential surface of the first sun gear;

the first planetary gear is in contact with the inner circumferential surface of the second region;

the second planetary gear part includes a second sun gear and a plurality of second planetary gears configured to rotate along an outer circumferential surface of the second sun gear; and the second planetary gear is in contact with the inner circumferential surface of the fourth region.

12. The motor of claim 11, wherein an outer diameter of the first sun gear is greater than an outer diameter of the second sun gear.

* * * * *